(12) United States Patent
Schneider et al.

(10) Patent No.: US 7,621,975 B2
(45) Date of Patent: Nov. 24, 2009

(54) COMPACT DEDUSTER WITH CYCLONIC AIR RECYCLING

(75) Inventors: Heinz Schneider, Lancaster, PA (US); Paul Wagner, Lancaster, PA (US)

(73) Assignee: Pelletron Corporation, Lancaster, PA (US)

( * ) Notice: Subject to any disclaimer, the term of this patent is extended or adjusted under 35 U.S.C. 154(b) by 594 days.

(21) Appl. No.: 11/441,312

(22) Filed: May 25, 2006

(65) Prior Publication Data
US 2007/0272598 A1 Nov. 29, 2007

(51) Int. Cl.
*B01D 50/00* (2006.01)
(52) U.S. Cl. ............... 55/315; 55/385.1; 55/433; 55/467
(58) Field of Classification Search .......... 55/315, 55/318, 337, 385.1, 418, 433, 467; 209/21, 209/12.1, 133
See application file for complete search history.

(56) References Cited

U.S. PATENT DOCUMENTS 2,963,152 A * 12/1960 Leslie et al. ............. 209/2
5,035,331 A 7/1991 Paulson ................. 209/3
6,032,804 A 3/2000 Paulson ............... 209/148
6,595,369 B2 * 7/2003 Paulson ............... 209/149

OTHER PUBLICATIONS

Pelletron Vertical Cyclonic Dust Collector Brochure (3 pages) Copyright 1999.

* cited by examiner

*Primary Examiner*—Robert A Hopkins
(74) *Attorney, Agent, or Firm*—Miller Law Group, PLLC

(57) ABSTRACT

A recycling mechanism is provided for use with a compact dedusting apparatus to clean the contaminate-laden air discharged from the dedusting apparatus for subsequent re-use by the dedusting apparatus. The recycling mechanism provides a closed loop air containment system that retains the air within the apparatus without providing discharge to the atmosphere. The recycling mechanism includes a cyclonic separator that removes most of the dust and contaminates from the air discharged from the deduster. The air discharged from the cyclonic separator is passed to an inline high efficiency synthetic cartridge filter for final cleaning before being passed back into the fan that drives cleansing air through the deduster. The contaminant material removed by the cyclonic separator is collected by an air tight dust collection container installed at the cyclone outlet for subsequent removal from the system.

20 Claims, 3 Drawing Sheets

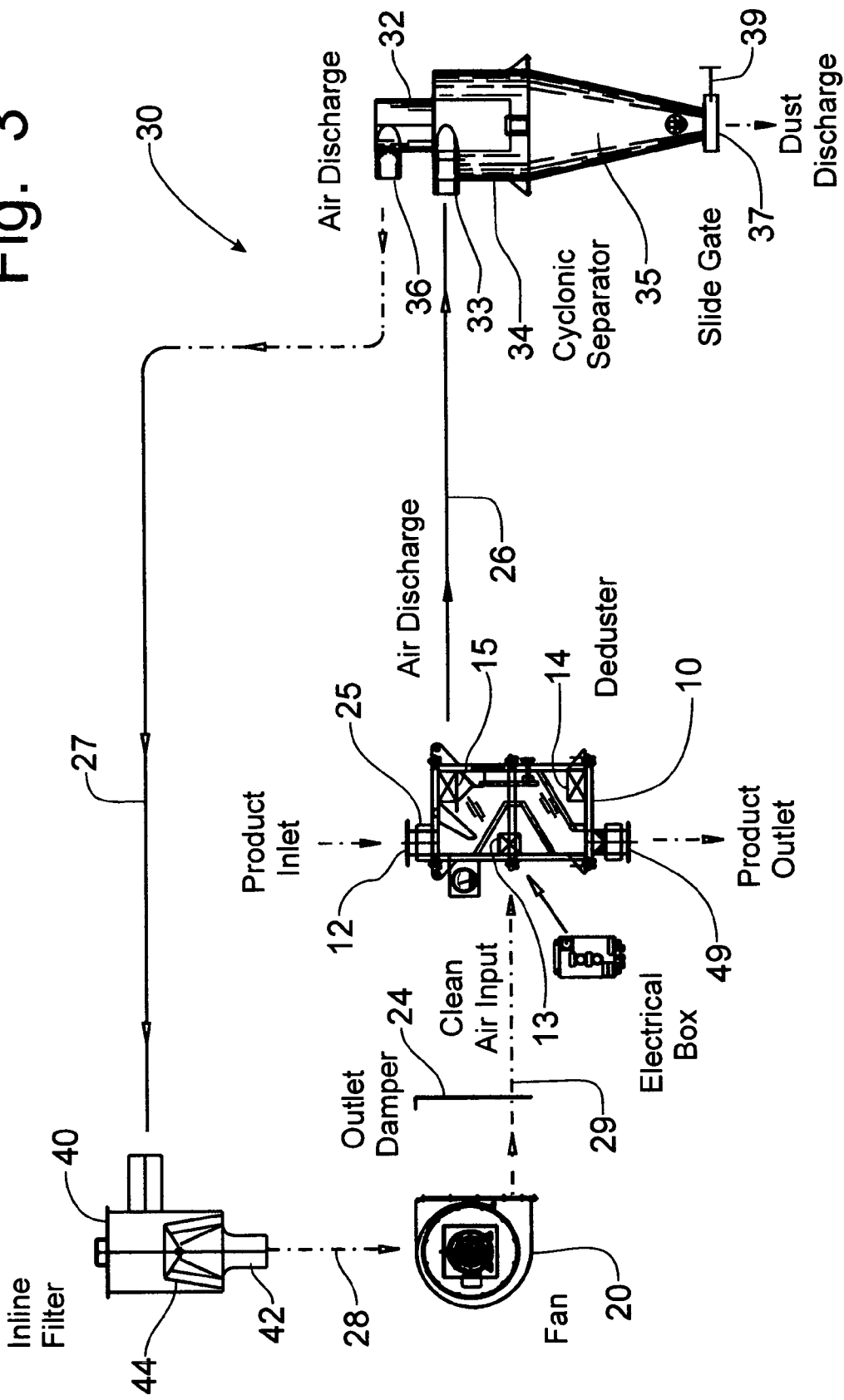

COMPACT DEDUSTER WITH CYCLONIC AIR RECYCLING

FIELD OF THE INVENTION

The invention disclosed in this application is directed generally to an apparatus for the cleaning and handling of particulate materials, such as plastic pellets, grains, glass, and the like, and particularly to the an apparatus that includes a cyclonic separator to recycle air discharged from the dedusting apparatus.

BACKGROUND OF THE INVENTION

It is well known, particularly in the field of transporting and using particulate materials, commonly powders, granules, pellets, and the like that it is important to keep product particles as free as possible of contaminants. Particulates are usually transported within a facility where they are to be mixed, packaged or used in a pressurized tubular system that in reality produces a stream of material that behaves somewhat like a fluid. As these materials move through the pipes, considerable friction is generated not only among the particles themselves, but also between the tube walls and the particles in the stream. In turn, this friction results in the development of particle dust, broken particles, fluff, streamers (ribbon-like elements that can "grow" into quite long and tangled), glass fibers in glass filled products, that can impede the flow of materials or even totally block the flow. The characteristics of such a transport system are quite well known, as is the importance and value of keeping product particles as free as possible of contaminants.

The term "contaminant" as used herein includes a broad range of foreign material and includes foreign material as well as broken particles or streamers of the product being transported. In either case, using plastics as an example, such foreign material would have a detrimental effect on the finished product. Specifically, foreign material different in composition from the primary material, such as dust, and non uniform material of the primary product, such as streamers, would not necessarily have the same melting temperatures as the primary product and would cause flaws when the plastics material is melted and molded.

Considering product quality, and focusing on moldable plastics as a primary example, foreign material different in composition from the primary material, such as dust, non-uniform material of the primary product, fluff, and streamers, does not necessarily have the same melting temperatures as the primary product and causes flaws when the material is melted and molded. These flaws result in finished products that are not uniform in color, may contain bubbles, and often appear to be blemished or stained, and are, therefore, unsellable. It is important to note that since these same non-uniform materials often do not melt at the same temperature as the primary product, the unmelted contaminants cause friction and premature wear to the molding machines, resulting in downtime, lost production, reduced productivity, increased maintenance and thus increased overall production costs.

Since dust and other contaminants are generated mostly by the transport system, it is of primary importance to not only provide apparatus for thoroughly cleaning the particles, but to do so as close to the point of use of the particles as possible so as to avoid the generation of contaminants through additional transport. Accordingly, compact dedusters have been used for many years to clean materials in this application, capable of handling smaller volumes of product, yet also capable of thoroughly cleaning the product. The compact dedusters permit the installation of the deduster immediately before final use of the products, rather than at an earlier stage after which re-contamination can occur.

Dedusters used to clean contaminants from particulate material can be found in U.S. Pat. No. 5,035,331, granted to Jerome I. Paulson on Jul. 30, 991, in which air is blown upwardly through wash decks over which a flow of contaminated particulate material is passed so that the flow of air up through the wash decks removes the contaminants from the material flow. A magnetic field is provided by the deduster so that the particulate material flow passes through the magnetic field to neutralize the static charge on the particulates and facilitate the removal of the contaminants from the material. The flow of contaminant laden air is discharged from the deduster, while the cleaned particulate material is passed on to the manufacturing process.

A compact dedusting apparatus is disclosed in U.S. Pat. No. 6,595,369, granted on Jul. 22, 2003, to Jerome I. Paulson. Like the larger dedusting apparatus depicted in U.S. Pat. No. 5,035,331, the follow of particulate material is cleansed of contaminates that have had the static charged attracting the contaminates to the particulates neutralized. The cleaning process utilizes a flow of air passing through the stream of particulate material passing over wash decks. The contaminate-laden air is discharged through the top of the dedusting apparatus, while the cleaned particulate material is discharged from the bottom of the deduster.

A cyclonic dust collector is disclosed in U.S. Pat. No. 6,032,804 issued to Jerome I. Paulson on Mar. 7, 2000. In this dust collection apparatus, which is purported to be cyclonic but the air is actually only passed around a semi-circular path to remove heavier dust particles by centrifugal force, a filter apparatus is positioned at the discharge opening to trap any remaining dust particles within the air stream. This dust collector apparatus is sold by Pelletron Corporation, assignee of the instant application, and is available in a horizontal version and a vertical version. In each instance, the filter is positioned at the discharge opening of the air and restricts the airflow through the housing. Furthermore, the filter is difficult to access for cleaning and/or removal from the dust collector.

This contaminate-laden air must be cleaned of the dust and contaminate material before being discharged to the atmosphere, as is typically the case. The conventional cleaning process uses a series of filters that must be continuously cleaned and frequently replaced to maintain efficiency in the cleaning process. Furthermore, the influx of fresh air into the dedusting apparatus, unless treated, is subject to fluctuations in moisture content and temperature, which affects the efficiency of the washing process in the deduster. If the air is treated to provide consistent moisture and temperature levels, such treatment adds to the expense of operating the dedusting apparatus.

Accordingly, it would be desirable to provide a compact dedusting apparatus that can be placed in-line of the particulate material flow immediately prior to the use of the particulate material in a manufacturing process, while providing for a recycling of the discharged air back into the dedusting apparatus.

SUMMARY OF THE INVENTION

It is an object of the invention to overcome the disadvantages of the prior art by providing a compact dedusting apparatus that has an air recycling mechanism to remove contaminants from the air discharged from the deduster and return the cleaned air to the dedusting apparatus for use in cleaning contaminants.

It is another object of this invention to provide an effective compact dedusting apparatus that can thoroughly clean a flow of particulate material of dust particles and other contaminants immediately prior to the particulate material being used.

It is an advantage of this invention that the costs of operating a particulate material dedusting apparatus are lowered.

It is a feature of this invention that the recycling mechanism for the compact dedusting apparatus includes a cyclonic separator to remove contaminants from the flow of air discharged from the dedusting apparatus.

It is still another object of this invention to provide a recycling mechanism to clean discharged air from a dedusting apparatus so that the airflow into a dedusting apparatus will be contained in a closed system.

It is another feature of this invention that the recycling apparatus utilizes an inline filter to clean any remaining small diameter contaminates from the airflow discharged from the cyclonic separator.

It is still another feature of this invention that the dust and other contaminants removed from the cyclonic separator are discharged by gravity into a collection system that can be removed from the recycling mechanism.

It is yet another object of this invention to provide a dedusting system that is mounted on a movable frame to provide a mobile closed loop dedusting apparatus that can be relocated from one location to another.

It is yet another feature of this invention that the dedusting system includes a dedusting apparatus with a cyclonic separator, inline filter and fan in flow communication with the dedusting apparatus mounted on a frame to provide a self-contained closed loop dedusting system that can be moved.

It is another advantage of this invention that the energy consumption of the closed loop air containment system is lower than conventional dedusting systems, as the fan need only to add whatever energy is lost during operation of the recycling mechanism.

It is yet another advantage of this invention that as a result of the lack of a need for a dust collector, no cleaning of a dust filter is required to maintain the dust collection system.

It is still another advantage of this invention that granular materials with heavy dust contamination can be cleaned efficiently.

It is yet another advantage of this invention that the closed loop air containment system can be utilized for dried air and nitrogen applications.

It is a further advantage of this invention that the noise level corresponding to the operation of the dedusting apparatus is lowered due to the use of the closed loop air containment system.

It is still a further advantage of this invention that the dedusting apparatus and recycling mechanism can be mounted on a mobile stand for easy relocation.

It is yet another object of this invention to provide a recycling mechanism for use with a compact dedusting apparatus that includes a cyclonic separator, an inline filter, and ductwork to direct the cleaned air back to the fan to provide air with adequate velocity to use in the dedusting apparatus.

It is a further object of this invention to provide a compact dedusting apparatus with a closed loop air recycling mechanism that is durable in construction, inexpensive of manufacture, carefree of maintenance, facile in assemblage, and simple and effective in use.

These and other objects, features and advantages are accomplished according to the instant invention by providing a recycling mechanism for use with a compact dedusting apparatus to clean the contaminate-laden air discharged from the dedusting apparatus for re-use by the deduster. The recycling mechanism provides a closed loop air containment system that retains the air within the apparatus without discharge to the atmosphere. The recycling mechanism includes a cyclonic separator that removes most of the dust and contaminates from the air discharged from the deduster. The air discharged from the cyclonic separator is passed to an inline high efficiency synthetic cartridge filter for final cleaning before being passed back into the fan that drives cleansing air through the deduster. The contaminant material removed by the cyclonic separator is collected by an air tight dust collection container installed at the cyclone outlet for subsequent removal from the system.

BRIEF DESCRIPTION OF THE DRAWINGS

The advantages of this invention will become apparent upon consideration of the following detailed disclosure of the invention, especially when taken in conjunction with the accompanying drawings wherein:

FIG. 3 is a flow diagram depicting the operation of the closed loop air containment system incorporated into the recycling mechanism to re-use air discharged by the dedusting apparatus.

DETAILED DESCRIPTION OF THE PREFERRED EMBODIMENT

Figure 1:
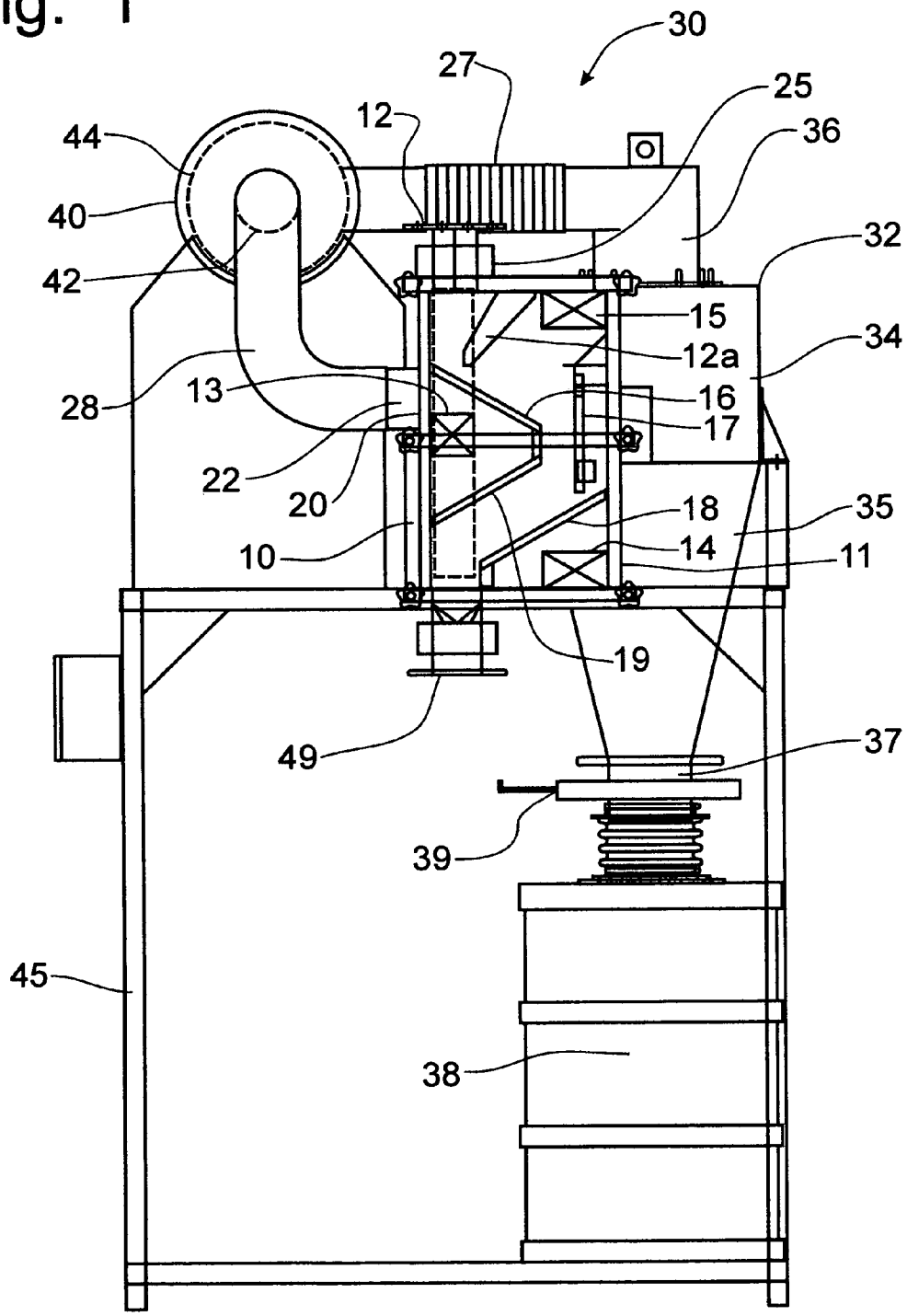
FIG. 1 is an elevational view of a compact dedusting apparatus and air recycling mechanism incorporating the principles of the instant invention.
Figure 2:
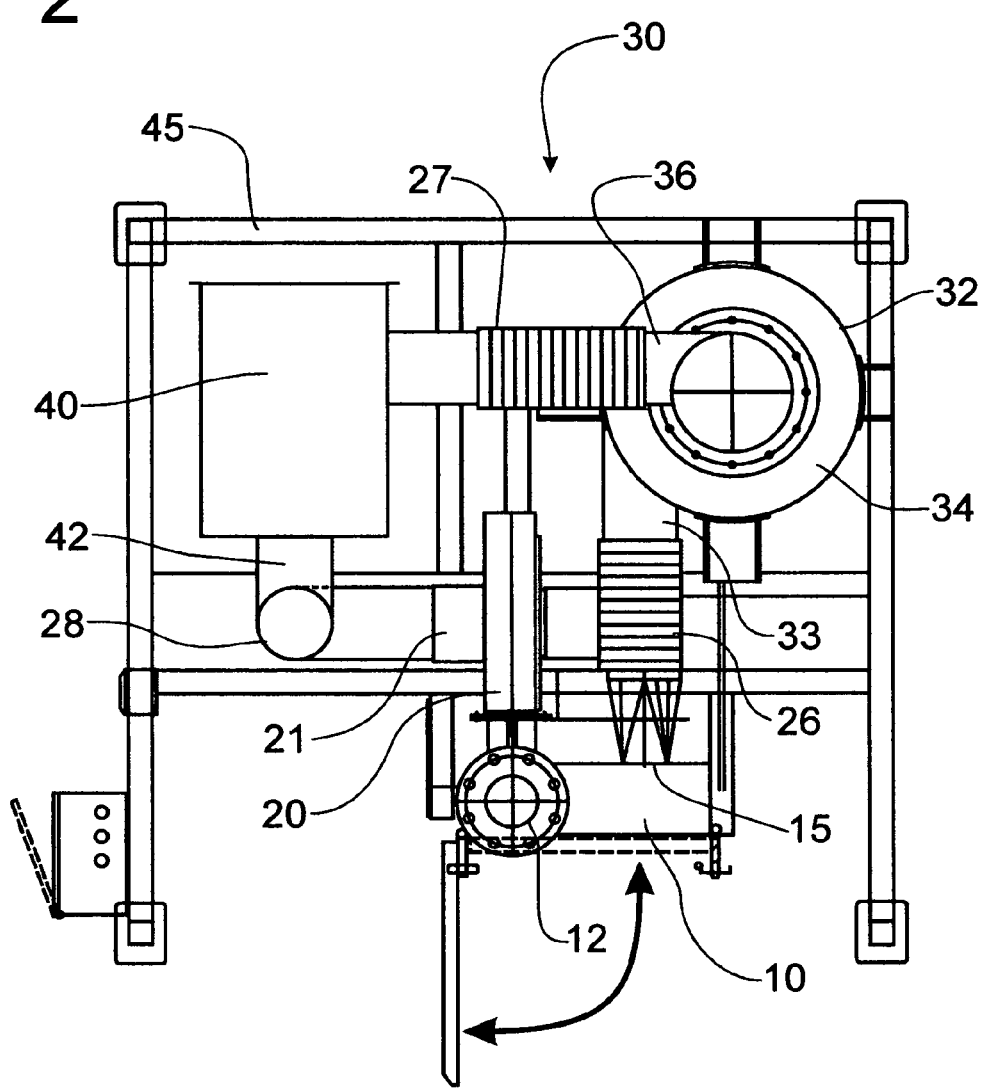
FIG. 2 is a top plan view of the compact dedusting apparatus and air recycling mechanism depicted in FIG. 1.

The dedusting apparatus is known in the art. A description of the structure and operation of a dedusting apparatus and a compact dedusting apparatus can be found in U.S. Pat. No. 5,035,331 and in U.S. Pat. No. 6,595,369, both of which were issued to Jerome I. Paulson, the contents of each of these patents being incorporated herein by reference. Typical particulate material to be cleaned by the dedusting apparatus 10 is plastic pellets that are to be passed into an injection molding machine to form plastic components. Examples of plastic particulate material that can be cleaned of contaminate material by the dedusting apparatus 10 are polyester, acrylic, high density polyethylene, polypropylene, nylon, polycarbonates, styrene, and low density polyethylene. Other types of particulate material that can be cleaned in the dedusting apparatus 10 include glass particles and grain.

Generally, the plastic pellets will have dust and streamers adhered thereto. Either the dust or the streamers or both could be of the same material as the plastic particulate product or the dust and/or streamers could be completely dissimilar contaminants. It is important, and therefor the primary object of the present invention, to separate dust, streamers and the like from the particulates being cleaned in the dedusting apparatus, so as to pass only clean particulate product through the exit port of the dedusting apparatus.

The dedusting apparatus 10 is mounted in a vertical portion of a fluent material handling system (not shown) such that the particulate material is fed into an inlet port 12 located at the top of an airtight casing 11. A magnetic flux field generator 25 is mounted at the inlet port 12 so that the flow of particulate material into the casing 11 is subjected to the magnetic flux field to neutralize the static charges on the particulate pellets, thus making the separation of the contaminates from the pellets easier to accomplish. Air is fed into the casing 11 from a fan 20 through an air inlet port (not shown) in the back of the casing 11. The air is distributed through internal passages to an inlet opening 13 below the first air wash deck 16 and to a second inlet opening 14 below the second air wash deck 18.

The particulate material is deflected onto the first air wash deck 16 which is supported on the casing 11 in a downward inclined oriented at a minimum angle of 30 degrees from the horizontal. The first air wash deck 16 has a patterned array of holes and slots, the holes creating jets of air, which are directed substantially vertically through the product layer flowing over the first air wash deck 16, causing the dust and streamers on the particulate product to be entrained in the airflow and be driven upwardly away from the particulate product. The slots in the first air wash deck 16 provide a ribbon or sheet of air, which accelerates the particulate product forwardly along the product path over the first air wash deck 16 toward the deflector plate 17. This increased velocity of the product permits use of higher counter current air velocity resulting in improved cleaning efficiency.

A second air wash deck 18 is supported by the casing 11 in a downwardly directed incline opposite to that of the first air wash deck 16, though also oriented at a minimum angle of 30 degrees to the horizontal. Pressurized air is introduced into the second air wash deck 18 from the second inlet opening 14 to pass upwardly through the second air wash deck 18 similarly to that described above with respect to the first air wash deck 16 to clean any remaining contaminates from the flow of particulate product directed onto the second air wash deck 18 off the first deflector plate 17. A discharge opening 15 is provided for discharging the contaminate-laden airflow from the casing 11 and the dedusting apparatus 10.

A second deflector panel 19 oriented generally parallel to the second air wash deck 18 and spaced above the second air wash deck 18 serves to deflect the air passing through the second air wash deck 18 upwardly through the stream of particulate product passing off the end of the first air wash deck 16 before being deflected by the first deflector plate 17 to provide yet another cleansing pass of air through the particulate material within the dedusting apparatus 10. Ultimately, all of the air passing through the first and second inlet openings 13, 14 is discharged from the dedusting apparatus 10 through the discharge opening 15 at the top of the casing 11 opposite the product inlet opening 12.

In operation, the dedusting apparatus 10 receives a volume of contaminated particulate material to be cleaned which is introduced into the product inlet port 12. The particulate material passes through the magnetic flux field generated by generator 25 to disrupt the static charge attraction causing the contaminates to adhere to the particulate material. Material flow control is important in order to cause particulate particles to disperse in such a way that air can flow freely through the product stream so as to lift contaminants upward away from the product. The flow of material through the dedusting apparatus 10 is controlled by the positionally adjustable inlet deflector member 12a to drop onto the first air wash deck 16. If the layer of particulate material on the first air wash deck 16 is too thick, air may prevented from passing efficiently through the particulate material to separate out the contaminates. If the layer of particulate material is too thin, the airflow will not be efficiently utilized.

Pressurized air flows through the holes in first air wash deck 16 to separate the contaminates from the individual pellets of material, which is smaller and lighter than the primary product 10. The airflow through slots accelerates the partially cleaned product toward deflector plate 17. This partially cleaned particulate product then falls through toward the first deflector plate 17 and passes through a higher velocity venturi counter airflow passing upwardly from the second air wash deck 18 through the narrowed opening between the first air wash desk 16 and the first deflector plate 17 that creates the venturi effect. The particulate product then falls onto the second air wash deck 18 for a further separation of contaminates from the particulate product. The second deflector plate 19 directs the air passing through the second air wash deck 18 and the layer of particulate material thereon into the venturi as defined above.

The first air wash deck 16 separates small particles of 100 microns and less from the flow of particulate material thereon. The venturi chamber (between the first air wash deck 16 and the first deflector plate 17, when adjusted correctly, will remove larger contaminants, thereby providing a two stage separation of contaminants as large as $1/16$ of an inch. The particulate material is then passed across the second air wash deck 18 with residual contaminates being separated at this time. Finally, the cleaned product drops to the bottom of the casing 11 and is discharged out of the dedusting apparatus 10 through the product outlet port 49.

The fan 20 generates an airflow discharged therefrom directly into the casing 11 of the dedusting apparatus 10 with sufficient velocity that the air discharged through the discharge opening 15 from the casing 11 is then directed into and through the recycling mechanism 30, as will be described in greater detail below, overcoming all of the frictional and resistance losses to which the airflow is subjected within the recycling mechanism 30 and still each the inlet port 22 of the fan 20 to be recirculated through the dedusting apparatus 10 as cleaned air. An outlet damper 24, schematically represented in FIG. 3, can be provided to control the airflow from the fan 20.

The first component of the recycling mechanism 30 is the cyclonic separator 32. The cyclonic separator 32 is a conventional device that receives the flow of contaminate-laden air through a first ductwork 26 interconnecting the air discharge opening 15 of the dedusting apparatus and the inlet port 33. The cyclonic separator operates to swirl the airflow around a cylindrical chamber 34 to remove the heaver dust particles, streamers and other contaminates from the air due to centrifugal force as the air is circulated around the cylindrical chamber 34. The contaminate particles, having been separated from the air which is moving rapidly in a circular path within the cylindrical chamber 34, lose velocity and fall along the outer circumference of the cylindrical chamber 34. The swirling airflow continues downwardly from the cylindrical chamber 34 into the conical chamber 35 where the airflow increases speed due to the increasingly smaller radius of its spiraled path downwardly along the conical chamber 35.

The increased velocity of the airflow along with the decreasing radius of the flow path increases the centrifugal forces on the entrained contaminate particles, causing even lighter particles to be separated from the airflow and slide downwardly along the outer circumference of the conical chamber 35. An air discharge pipe 36 extends into the center of the conical chamber 35 to provide a discharge port for the cleansed air to move upwardly through the air discharge pipe 36 and away from the cyclonic separator 32. The separated contaminate particles continue by gravity downwardly along the outer periphery of the conical chamber 35 to the contaminate discharge opening 37 to be collected by a collection device 38. A slide gate 39 is provided to close off the contaminate discharge port 37 in order to remove the collection device 38 and substitute a new one.

The airflow discharged from the cyclonic separator 32 will largely be cleaned of particulates, although some of the smallest contaminates could still be entrained in the air flow. To remove these last remaining contaminate particles, the air discharged through the air discharge port 36 in the cyclonic separator 32 is directed by second ductwork 27 into an inline filter 40 containing a high efficiency synthetic cartridge filter 44 that can remove particles as small as one micron from the air flow. The air discharged from the outlet 42 of the inline filter 40 will be as clean, if not cleaner, than any fresh air that could be drawn into the fan 20. Third ductwork 28 carries the cleaned air from the outlet 42 into the inlet port 22 of the fan 20 to be recirculated into the dedusting apparatus 10 through fourth ductwork 29.

The recycling mechanism 30 and the dedusting apparatus 10 are mounted on a frame 45 to permit the entire system to be moved from one job location to another, with the air recycling operation being a closed loop containment apparatus that feeds the requisite airflow into the dedusting apparatus 10 to effectively clean particulate material passing through the dedusting apparatus 10. The mounting of the entire dedusting system on a frame allows a flexible utilization of the system in that the dedusting apparatus can be easily moved from one manufacturing machine to another while one is being serviced or repaired.

It will be understood that changes in the details, materials, steps and arrangements of parts, which have been described and illustrated to explain the nature of the invention will occur to and may be made by those skilled in the art upon a reading of this disclosure within the principles of the scope of the invention. The foregoing description illustrates the preferred embodiment of the invention; however, concepts, as based upon the description may be employed in other embodiments without departing from the scope of the invention. Accordingly, the following claims are intended to protect the invention broadly, as well as in the specific form shown.

Having thus described the invention, what is claimed is:

1. A closed loop air containment system for a particulate material dedusting apparatus operable to remove contaminants from a flow of particulate material by a stream of air entering an air inlet port as a clean air stream, flowing through at least one air wash deck, and discharging through an air discharge port as a contaminate-laden air stream, comprising:
    a cyclonic separator connected by first ductwork to the air discharge port of said dedusting apparatus, said cyclonic separator receiving said stream of air directly from said dedusting apparatus and spiraling said stream of air around a conical chamber to separate said contaminants from said contaminate-laden air stream before being discharged from said cyclonic separator as a partially cleaned air stream;
    an inline filter connecting to said cyclonic separator by second ductwork to receive said partially cleaned air stream therefrom, said inline filter being operable to remove remaining contaminates in said partially cleaned air stream before being discharged therefrom as said clean air stream, said clean air stream being delivered to said air inlet port by third ductwork; and
    a fan positioned to receive said clean air stream from said inline filter and increase a velocity property of said clean air stream for transfer into said air inlet port of said dedusting apparatus, said first, second and third ductwork defining a closed loop system to receive said contaminate-laden air stream from said air discharge port of said material dedusting apparatus and deliver said clean air stream to said air inlet port of said material dedusting apparatus without discharging air therefrom.

2. The closed loop air containment system of claim 1 wherein said inline filter includes a high efficiency synthetic cartridge filter through which said partially cleaned air stream passes to effect removal of said remaining contaminates.

3. The closed loop air containment system of claim 2 wherein said cyclonic separator, said inline filter, said fan and said dedusting apparatus are mounted on a frame for operatively positioning as an integrated system.

4. The closed loop air containment system of claim 3 wherein said dedusting apparatus includes a product inlet port and a product outlet port, said at least one air wash deck being positioned between said product inlet port and said product outlet port so that said particulate material can flow by gravity from said product inlet port to said product outlet port after being cleaned by said flow of air through said at least one air wash deck.

5. The closed loop air containment system of claim 4 wherein said cyclonic separator has a cylindrical chamber that initially receives said contaminate-laden air stream from said dedusting apparatus and initiate a circular movement of said air stream therein, said conical chamber being positioned in flow communication with said cylindrical chamber to receive said air stream and cause said air stream to circle in a progressively decreasingly smaller radius flow path until being discharged from said cyclonic separator.

6. The closed loop air containment system of claim 5 wherein said flow path within said conical chamber of said cyclonic separator causes said contaminates to become separated from said air stream due to the application of centrifugal force, said contaminates separated from said air stream falling along an outer periphery of said conical chamber to be discharged therefrom into a dust collection device.

7. The closed loop air containment system of claim 6 further comprising a slide gate positioned between said conical chamber and said dust collection device so that said conical chamber can be closed to permit a removal of said dust collection device without shutting down said dedusting apparatus and said closed loop air containment system.

8. The closed loop air containment system of claim 7 wherein an outlet damper is used in said closed loop air containment system to control air flow into said fan from said inline filter.

9. A particulate material dedusting system comprising:
    a dedusting apparatus including:
        a product inlet port for the introduction of a flow of contaminated particulate material into said dedusting apparatus;
        a magnetic flux field generator associated with said product inlet port to subject said flow of contaminated particulate material to a magnetic flux field to neutralize static charges on said particulate material;
        a product outlet port for the discharge of cleaned particulate material from said dedusting apparatus;
        at least one air wash deck positioned between said product inlet port and said product outlet port to receive said flow of contaminated particulate material from said product inlet port;
        an air inlet port for the introduction of a clean air stream into said dedusting apparatus, said clean air stream being directed through said at least one air wash deck to pass through said flow of contaminated particulate material and remove contaminates therefrom to create a contaminate-laden air stream; and
        an air discharge port for the discharge of said contaminate-laden air stream from said dedusting apparatus;
    a cyclonic separator connected by first ductwork to said air discharge port to receive said contaminate-laden air stream therefrom and discharge a partially cleaned stream of air;
    an inline filter connected by second ductwork to said cyclonic separator to receive said partially cleaned stream of air from said cyclonic separator, remove remaining contaminates in said partially cleaned air stream, and discharge said clean air stream; and a fan connected by third ductwork to said inline filter to receive said clean air stream, increase a velocity property of said clean air stream, and directed said clean air stream into said air inlet port of said dedusting apparatus, said first, second and third ductwork defining a closed loop system to receive said contaminate-laden air stream from said air discharge port of said material dedusting apparatus and deliver said clean air stream to said air inlet port of said material dedusting apparatus without discharging air therefrom.

10. The dedusting system of claim 9 wherein said cyclonic separator, said inline filter, said fan and said dedusting apparatus are mounted on a frame for operatively positioning as an integrated system.

11. The dedusting system of claim 9 wherein said particulate material flows by gravity from said product inlet port, over said at least one air wash deck to said product outlet port.

12. The dedusting system of claim 11 further comprising first and second air wash decks with said second air wash deck receiving said flow of particulate material from said first air wash deck after passing through a venturi opening, said clean air being directed upwardly through said first and second air wash decks and through said particulate material to remove contaminates therefrom.

13. The dedusting system of claim 12 wherein said air flow passes from said second air wash deck through said venturi opening to remove contaminates from the flow of particulate material passing through said venturi opening before reaching said air discharge port.

14. The dedusting system of claim 9 wherein said cyclonic separator includes:

a cylindrical chamber that initially receives said contaminate-laden air stream from said dedusting apparatus and initiate a circular movement of said air stream therein; and a conical chamber being positioned in flow communication with said cylindrical chamber to receive said air stream from said cylindrical chamber and cause said air stream to circle in a progressively decreasingly smaller radius flow path until being discharged from said cyclonic separator.

15. The dedusting system of claim 14 wherein said flow path within said cylindrical chamber and said conical chamber of said cyclonic separator causes said contaminates to become separated from said air stream due to the application of centrifugal force, said contaminates separated from said air stream falling along an outer periphery of said conical chamber to be discharged therefrom into a dust collection device.

16. The dedusting system of claim 15 further comprising a slide gate positioned between said conical chamber and said dust collection device so that said conical chamber can be closed to permit a removal of said dust collection device without terminating the flow of said contaminate-laden air stream through said cyclonic separator.

17. The dedusting system of claim 9 wherein said inline filter includes a high efficiency synthetic cartridge filter through which said partially cleaned air stream passes to effect removal of said remaining contaminates.

18. A closed loop particulate material dedusting system comprising:

a frame movably positionable in conjunction with a flow of particulate material;

a dedusting apparatus mounted on said frame and including a product inlet port, an air wash deck, and a product outlet port for the gravity induced flow of contaminated particulate material through said dedusting apparatus, said dedusting apparatus further including an air inlet port for the introduction of a clean air stream into said dedusting apparatus, said clean air stream being directed through said air wash deck to pass through said flow of contaminated particulate material and remove contaminates therefrom to create a contaminate-laden air stream for discharge through an air discharge port;

a magnetic flux field generator associated with said product inlet port to subject said flow of contaminated particulate material to a magnetic flux field to neutralize static charges on said particulate material;

a cyclonic separator mounted on said from and being connected by first ductwork to said air discharge port to receive said contaminate-laden air stream therefrom and discharge a partially cleaned stream of air;

an inline filter mounted on said frame and being connected by second ductwork to said cyclonic separator to receive said partially cleaned stream of air from said cyclonic separator, remove remaining contaminates in said partially cleaned air stream, and discharge said clean air stream; and a fan mounted on said frame and being connected by third ductwork to said inline filter to receive said clean air stream, increase a velocity property of said clean air stream, and directed said clean air stream through fourth ductwork into said air inlet port of said dedusting apparatus for use to remove contaminates from said flow of contaminated particulate material.

19. The dedusting system of claim 18 wherein cyclonic separator includes:

a cylindrical chamber that initially receives said contaminate-laden air stream from said dedusting apparatus and initiate a circular movement of said air stream therein; and a conical chamber being positioned in flow communication with said cylindrical chamber to receive said air stream from said cylindrical chamber and cause said air stream to circle in a progressively decreasingly smaller radius flow path until being discharged from said cyclonic separator, said flow path within said cylindrical chamber and said conical chamber of said cyclonic separator causing said contaminates to become separated from said air stream due to centrifugal force, said contaminates being separated from said air stream falling along an outer periphery of said conical chamber to be discharged therefrom into a dust collection device.

20. The dedusting system of claim 19 wherein said inline filter includes a high efficiency synthetic cartridge filter through which said partially cleaned air stream passes to effect removal of said remaining contaminates.

* * * * *